United States Patent [19]

Li et al.

[11] Patent Number: 5,568,482
[45] Date of Patent: Oct. 22, 1996

[54] LOW SPEED RADIO LINK SYSTEM AND METHOD DESIGNED FOR ATM TRANSPORT

[75] Inventors: Kwok-Leung Li, The Woodlands, Tex.; Jeong H. Kim, Silver Spring, Md.

[73] Assignee: Yurie Systems, Inc., Lanham, Md.

[21] Appl. No.: 347,128

[22] Filed: Nov. 23, 1994

[51] Int. Cl.$^6$ .................. H04J 3/06; H04B 7/00
[52] U.S. Cl. ............... 370/79; 370/95.1; 370/99; 370/100.1
[58] Field of Search .............. 370/94.2, 99, 110.1, 370/100.1, 102, 112, 95.1, 79, 84

[56] References Cited

U.S. PATENT DOCUMENTS

| | | | |
|---|---|---|---|
| 5,189,671 | 2/1993 | Cheng | 370/99 |
| 5,214,642 | 5/1993 | Kunimoto et al. | 390/82 |
| 5,214,643 | 5/1993 | Mueller et al. | 370/99 |
| 5,247,518 | 9/1993 | Takiyasu et al. | 370/94.2 |
| 5,265,096 | 11/1993 | Parruck | 370/110.1 |
| 5,274,768 | 12/1993 | Traw et al. | 395/275 |
| 5,299,044 | 3/1994 | Mosch et al. | 359/110 |
| 5,327,421 | 7/1994 | Hiller et al. | 370/60.1 |
| 5,341,376 | 8/1994 | Yamashita | 370/99 |

*Primary Examiner*—Douglas W. Olms
*Assistant Examiner*—Min Jung
*Attorney, Agent, or Firm*—Sixbey, Friedman, Leedom & Ferguson, P.C.; Daniel W. Sixbey; Eric J. Robinson

[57] ABSTRACT

A data protocol compatible with ATM data transmission systems that provides a frame format that allows for ATM cell transmission in a low speed, high noise link such as a radio link and further provides for reliable radio data communication in the ATM format through the provision of timing and control information. A TDMA implementation of the present protocol is suitable for reliable data communication between a single headend station and a plurality of mobile substations. The protocol format is such that simple and easy interconnection with standard ATM data communications systems can be made to allow for wide distribution of relevant data. The protocol is suitable for implementation in either software or low cost hardware.

44 Claims, 6 Drawing Sheets

| Radio Baud Rate Examples | Frame Time | Cell Time | Byte Time | Bit Time |
|---|---|---|---|---|
| 2,400 | 8.00s | 176.7 ms | 3.33 ms | 416.7 µs |
| 4,800 | 4.00s | 88.33 ms | 1.67 ms | 208.3 µs |
| 9,600 | 2.00s | 44.16 ms | 833 µs | 104.2 µs |
| 19,200 | 1.00s | 22.08 ms | 416.7 µs | 52.08 µs |
| 64,000 | 0.30s | 6.625 ms | 125 µs | 15.63 µs |

LOW SPEED RADIO LINK SYSTEM AND METHOD DESIGNED FOR ATM TRANSPORT

TECHNICAL FIELD OF THE INVENTION

The present invention relates to a data formatting protocol and method that facilitates data communications over a low speed radio link using a standard asynchronous transfer mode (ATM) data format and more specifically to a data formatting method that permits easy interfacing between an ATM data communication system and a low speed radio data communication link.

BACKGROUND OF THE INVENTION

ATM Data Protocol

The demand for fast, efficient and accurate transmission of digital data has vastly increased in recent years. In response to this demand, international standards for the transmission of digital data have been established and implemented. One such standard that is widely accepted and used is known as the Asynchronous Transfer Mode, or ATM.

ATM is a data transmission protocol that provides a standardized data format for the transmission of digital data over a high speed data transmission network and that facilitates the transmission of data belonging to numerous different applications on a single network. An important advantage of the ATM protocol is that it provides a single transmission format by which data from a variety of network data sources can be transmitted in a single transmission format, rather than requiring separate transmission formats and processing facilities for each type of data.

In the ATM protocol, all data is transmitted and received in the form of fixed-length packets or "cells," of 53 bytes each. Each 53 byte ATM cell includes a 48 byte payload and a 5 byte header. This header includes a virtual channel identifier (VCI) that indicates the particular channel or connection to which the cell belongs and is used to direct the cell to various switching points in the network. The ATM cell header also includes a one byte Header Error Check (HEC) that provides for 1 bit error correction and 2 bits error detection. Therefore, if a single bit in the 53 byte cell is in error, that bit can be corrected using the HEC, and if two bits are in error, the HEC will allow the receiving station to identify that a transmission error has occurred.

In an ATM communication system, the HEC is also used to delineate the ATM cells, which permits cell delineation without requiring any additional overhead bits to flame the ATM cell. Instead, the ATM cell framing is established by monitoring a received data stream for valid HEC bytes. If valid HEC bytes spaced exactly 53 bytes apart are detected for several consecutive flames, then valid ATM cell framing has been determined. Once this flaming has been determined, the receiving station can be synchronized to the incoming ATM data stream so that payload data can be received and processed.

This method of cell delineation, however, does not work well in high noise environments, such as radio transmission environments. Excessive bit errors can cause consecutive cells to register as having an error in the HEC byte, and thus cause the receiving end to assume the link is out of synchronization. The receiver at the receiving end will then go into a re-synchronization mode which, as described above, will search for a certain predetermined number of consecutive valid HEC bytes in order to re-establish link synchronization. During this re-synchronization process, however, data transmission will be suspended. Since payload data is not used during the re-synchronization process, ATM cells containing valid data can be lost. In a low data rate communications link, this data loss leads to additional delay and inefficiency in data transmission.

The ATM technique is referred to as being asynchronous because the slots in the frames of the signals are not reserved for the cells of particular applications, but instead are filled by the cells of various applications in accordance with the various applications' current demand for slots and the current availability of slots.

Each standardized ATM cell can be transmitted using any suitable data communications network. Typically ATM cells are transmitted over a standard telecommunications channel using a high speed network such as a Synchronized Optical Network (SONET), in which each ATM cell is provided to a slot in a frame of the SONET signal. Traditionally, the ATM standard has been used in the transmission of broadband telecommunications services such as B-ISDN and other high speed data communications applications.

Previously, however, there has not been recognized a need or ability to use the ATM data format for low speed data communications and particularly not for low speed radio data applications. The wide acceptance of the ATM standard for transferring data over standard telecommunications channels, however, facilitates fast, easy, worldwide data communications and therefore makes it an attractive option where standardized data formats are desired.

As used herein, the term "standard telecommunications channel" includes any data communication channel suitable for high speed digital data transmission, such as a Synchronized Optical Network, or SONET. Typically, such data communication channels are wireline based, but wireless transmission should not be excluded if similar data transmission performance can be achieved. Furthermore, such data communication channels generally experience lower bit error rates than comparable radio data transmission channels.

Radio Communications

Radio communications between a base station or headend and a plurality of mobile substations (such as aircraft or automobiles) have typically been accomplished through the use of push-to-talk (PTT) voice systems. More recently, data communication systems have been used. However, due to the noisy environment often found in radio systems, high speed data communication can be difficult. This is especially true where data communication is to occur between one or more mobile stations. As these mobile stations move, radio frequency propagation and interfering signals vary in magnitude and frequency. This can result in radical and rapid changes in data transmission errors.

One solution to this problem is to provide error correction data in the data transmission itself. This is known as forward error correction and allows for a number of data errors to be corrected by the receiving station. The use of forward error correction, however, results in a reduced data throughput when the transmission channel is of high quality since the forward error correction data is not needed to correct bit errors and is simply discarded by the receiving station. Another solution is to reduce the data rate of the data transmission, and to thereby reduce the number of data errors in a given time period. This of course may be unsatisfactory if substantial data throughput is required.

Regardless of the method used to ensure accurate data transmission over the radio communication link, compatibility problems can arise due to radio specific data protocols being mismatched with commonly used wireline data transmission standards. Particularly, if a complex error correcting protocol is used on a wireless radio link, while a simple checksum error detecting protocol is employed on a wireline link, then data format incompatibilities can result. To overcome these compatibility problems, the data must be converted from one format to the other. Such conversion can take considerable time and require substantial hardware or software to accomplish. These format incompatibilities also increase the difficulty in adapting a standard wireline telecommunications protocol, such as ATM, to a wireless environment.

Another problem in using ATM in the wireless environment is that ATM is normally used in the telecommunications environment, which is an isochronous network with clock stability synchronized with a known common network clock source. Commonly known as the Stratum clock hierarchy, this clock runs at 8 kHz, and provides the standard for all telecommunications channels with the basic rate of multiples of 64 kbits per second (kbps). This clock is critical because it provides timing information to extract voice, video and many other time "sensitive" services. The wireless environment on the other hand, runs synchronously or asynchronously without a network clock synchronization on a bit rate historically tied to teletypes or modems, which is generally an integer multiple of 300 bps. However, the 8 or 64 kbps data rates are not even multiples of the 300 bps data rate and therefore timing information required to carry video or voice over ATM must be conveyed somehow between the two system with sufficient accuracy to provide long term stability.

SUMMARY OF THE INVENTION

In view of the foregoing, it is an object of the present invention to provide a data format and protocol for a radio data communications link that employs an ATM compatible data format.

It is a further object of the present invention to provide a radio link protocol that affords robust communications between a headend and a plurality of mobile substations in a standardized data communications format, such as the ATM data format.

It is yet another object of the present invention to provide a radio link data format that provides more robust ATM cell delineation and cell extraction than the standard ATM HEC delineation method, with a minimal addition of overhead bits.

A still further object of the present invention to provide a radio link data format that provides a clock relationship between the 8 kHz framing found in the standard telecommunications environment with the N×300 bps environment typical of radio data links.

It is yet another object of the present invention to provide a radio link data format that provides high quality data transmission while still providing a simple data format suitable for direct interconnection with standard wireline data communications systems.

Another object of the present invention is to provide a radio link protocol for transferring ATM cells that has improved framing information to maintain link synchronization under high error and burst error conditions.

It is a still further object of the present invention to provide a TDMA radio communication protocol for use between a single headend station and a plurality of mobile substations that is compatible with the ATM data format and that can be easily interfaced with a data communication system employing the ATM format.

It is yet another object of the present invention to provide a data format that allows for simple and efficient interconnection between a low speed radio data communications link and an ATM data communications link.

Yet another object of the present invention is to provide a data protocol suitable for use on a radio data communications link that supports fast recovery from bit-errors and signal fades.

It is a further object of the present invention to provide a physical layer protocol suitable for transporting ATM cells in low speed radio applications.

It is a still further object of the present invention to provide a low speed radio protocol compatible with the ATM data format suitable for data speeds ranging from 2,400 baud to the low megabauds.

These, as well as other objects of the present invention are achieved by a data formatting and transmission method in which a data signal suitable for transmission over a radio link is formatted to include a plurality of frames, each flame having a plurality of subframes, and each subframe having a plurality of ATM cells. Each flame includes a frame header and each subframe includes an individual subframe header. Together with the HEC bytes in the ATM cells, these headers cooperate to maintain link synchronization even under high error rate conditions.

DETAILED DESCRIPTION OF PREFERRED EMBODIMENT

Figure 1:
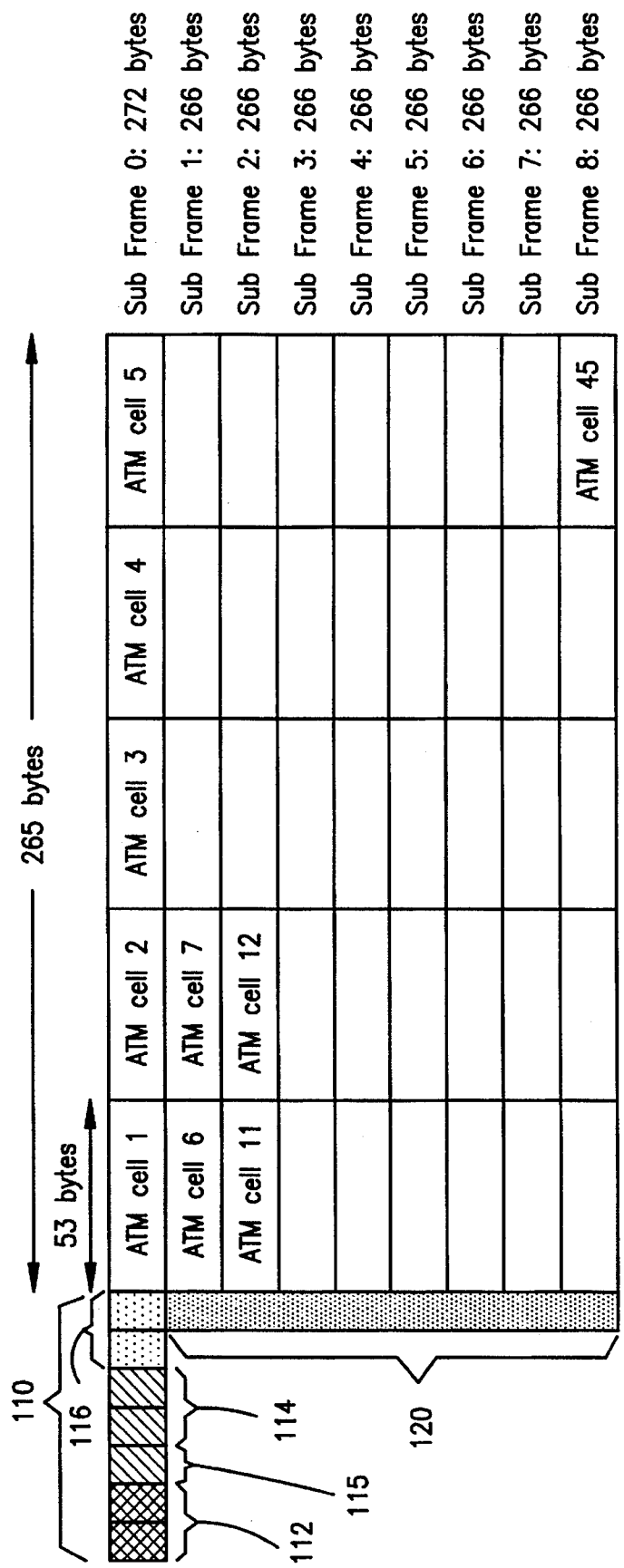
FIG. 1 illustrates an overview of a data frame in accordance with the present invention.

FIG. 1 shows an overview of a data frame formatted in accordance with the present invention. As illustrated in FIG. 1, each data frame 100 includes 45 53-byte ATM cells, a 7-byte frame header 110, and 8 1-byte subframe headers 120 for a total frame length of 2400 bytes. Each data frame 100 further includes 9 subframes (numbered 0 through 8). Subframes 1–8 are each 266 bytes in length and include 5 53-byte ATM cells and a 1-byte subframe header 120. Subframe 0 is 272 bytes in length and includes 5 53-byte ATM cells and the 7-byte frame header 110.

A 2400 byte total frame length was selected for several reasons. First, the use of a 2400 byte frame length results in low overhead. As described in more detail below, the protocol of the present invention adds 15 bytes of overhead (the 7-byte frame header 110 and eight 1-byte subframe headers 120) to 45 ATM cells (containing 2385 bytes) transported. This translates to an overhead of only 0.63%. This overhead includes integrated data communications channels that provide for equipment maintenance and management, as well as periodic flaming information used to maintain link synchronization.

Second, the selection of a 2400 byte frame length facilitates easy synchronization between a radio data transmission channel and a standard telecommunications channel. This results since 2400 bytes transmitted at usual radio bit rates (typically N×300 bps) generally results in time intervals having an integer relationship with the standard 8 kHz telecommunications synchronization clocks. For example, at a radio data rate of 9.6 kbps, a single frame of 2400 bytes will take 2 seconds to transmit. The standard telecommunications clock rate of 8 khz will produce exactly 16,000 clock pulses in this same 2 second period. Therefore, the selection of a 2400 byte frame length provides easy synchronization with standard telecommunications equipment.

The 7-byte frame header 110 includes a 2-byte framing header 112, a 1-byte bit-interleave-parity-8 (BIP-8) 115, 2-bytes 116 providing transport data communications channel support, and 2-bytes 114 reserved for other transport functions. The framing header (or frame indication bytes) 112 serves to indicate the start of a frame and to facilitate synchronization of the communications system, and could be, for example, F628 hexadecimal.

In the most preferred embodiment of the invention, the frame header 110 includes 1-byte 115, which represents a standard BIP-8 for the previously sent frame. This byte 115 serves as a quick integrity check for the link. Of course, other functions for this byte could be implemented in less preferred embodiments of the invention if this integrity check were eliminated.

The frame header 110 also includes 2 bytes 116 that act as a transport data communication channel. This channel has an effective data rate of 8 bps when the radio link is running at 9600 bps. One function of this data communication channel link is to provide for operation, administration and maintenance functions. For example, for operational functions, these bytes can be used to message the radios to perform adaptive functions (such as adaptive gain control) to dynamically optimize performance of the link. For example, the radios can measure the bit-error-rate and bit-error-seconds of the communications link. When the error condition exceeds certain predetermined limits, and if the type of radio deployed permits this function, the radios can use this messaging channel to perform corrective actions to improve the overall performance of the link.

For example, such corrective actions could include (1) decreasing the speed of the link, such as automatically changing from 9600 baud to 4800 baud; (2) increasing the output power of the transmitter; or (3) switching to a different frequency, modulation or encoding/error correction scheme.

Similarly, the data communication channel link can be used to increase the efficiency and enhance data transmission performance when link conditions warrant. For example, if the measured error rate is better than a predetermined level, the radios may use this channel to signal for a higher bit rate, thus improving the performance of the link.

Administrative messaging can include, for example, confirmation of equipment configurations at the opposite end of the communications link. Therefore, prior to transmission of data, one end of the link can confirm the availability and configuration of equipment at the opposite end in order to verify that such equipment is present and currently capable of receiving the data. Maintenance messages could be used, for example, to set the radio equipment into a loop back mode or to send a pre-set data pattern for trouble shooting and adjustments of the radio equipment.

The frame header 110 also includes 2-bytes 114, that are reserved for further expansion and could serve any purpose later determined to be desirable in the system. One such function for the 2-bytes 114 is to provide for network clock adjustments. This is accomplished through a technique commonly known as byte stuffing. If a networking element (such as a transmission or switching element using a protocol in accordance with the present invention) senses that there are mismatches between the radio transmission link clock and a communications network clock, the equipment can elect to insert an extra byte or skip a byte in the two byte window 114.

Specifically, in cases where the networking element senses that the radio transmission link clock is faster than the communications network clock, overall frame timing can be maintained by expanding bytes 114 to include 3-bytes rather than 2-bytes for that frame. This additional byte will be recognized by the receiver end and has the effect of increasing the frame time, thus maintaining long term frame stability and synchronization between the radio link and the communications network clock.

Conversely, in cases where the networking element senses that the radio transmission link clock is slower than the communications network clock, the transmitting equipment can reduce bytes 114 to s single byte instead of the usual 2 bytes. This deleted byte will allow the receiver to gain time to again maintain long term frame stability and synchronization between the radio link and the communications network clock.

The 1-byte subframe headers 120 are provided to indicate the beginning of each new subframe and to provide periodically repeating framing information that can be used to maintain synchronization in high error rate environments. Each subframe header 120 is most preferably a DC balanced code (i.e. a code having the same number of 1's and 0's) with both high and low frequency components. For example, in the most preferred embodiment of the present invention, the subframe header is E8 hexadecimal (11101000 binary). This bit pattern has four 1's and four 0's, and is therefore a DC balanced code. Furthermore, the middle 1010 bit pattern produces a high frequency component, while the 111 and 000 patterns provide a low frequency component. For this reason, the byte E8 is particularly well suited to be used as a subframe header in the present invention.

As noted above, the framing header (or frame indication bytes) 112 that serves to indicate the start of a frame and to facilitate synchronization of the communications system could be, for example, F628 hexadecimal. It should be noted that this is particularly advantageous since it, like the subframe header byte, is also a DC balanced code having both high and low frequency components. Therefore, if F628 is not used as a framing header, it would be preferable to use another DC balanced code as the framing header.

Figures 2, 3:
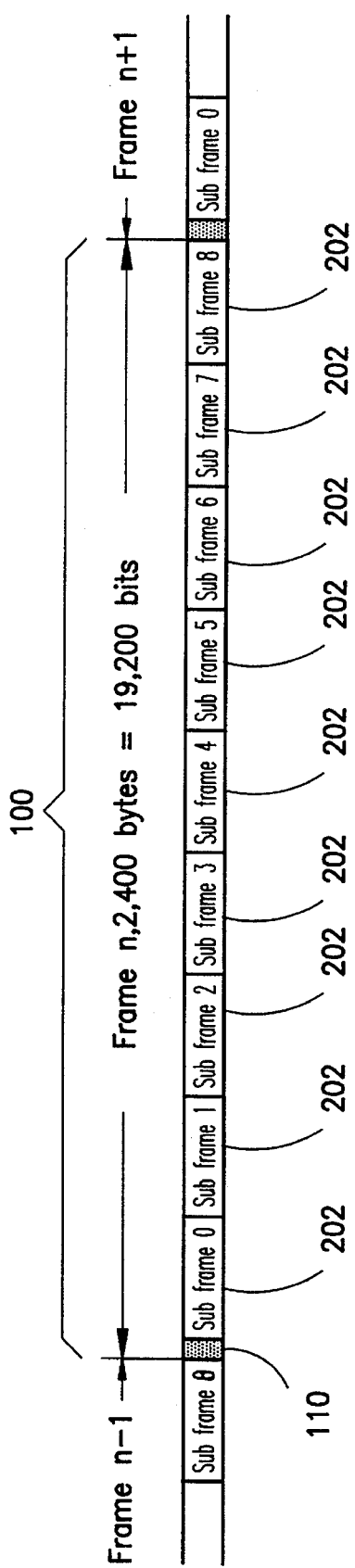
FIG. 2 illustrates the organization, during data transmission, of a frame header and a plurality of subframes within a single data frame shown in FIG. 1.
FIG. 3 is a chart illustrating the timing used in the present invention for different bit transmission rates.

Referring next to FIG. 2, the organization during data transmission of the frame header 110 and of the subframes of a single data frame shown in FIG. 1 is illustrated. As seen in FIG. 2, a single frame 100 containing 9 subframes 202 of data is transmitted in the present system. Preceding each sequential group of 9 subframes in a frame header 110. Together, the 9 subframes 202 and the frame header 110 make up a single data frame as shown in FIG. 1, which is sequentially transmitted as shown in FIG. 2 in accordance with the present invention. Also, although not shown in FIG. 2 for clarity, each subframe 202 includes a subframe header byte 120.

The timing used in the most preferred embodiment of the present invention for different bit transmission rates is illustrated in FIG. 3. Since, as noted above, the present protocol is capable of transferring data at data rams in the megabits per second, these bit transmission rams should be viewed as illustrative only. Similar timing information could easily be derived by one of skill in the art for other data rates to which the protocol is well suited.

FIG. 3 depicts the time of transmission for a single frame, cell, byte and bit for radio baud (bit) rates of 2.4, 4.8, 9.6, 19.2 and 64 kbps. As can be seen in FIG. 3, frame times range from as long as 8 seconds to less than one-third of a second, while ATM cell times range from approximately 176.7 milliseconds to 6.625 milliseconds.

Importantly, the radio baud rates shown in FIG. 3 all result in a frame time that facilitates easy synchronization with the standard 8 khz clock rate associated with telecommunications systems. The frame times of 0.30, 1.00, 2.00, 4.00 and 8.00 seconds correspond to 2400, 8000, 16000, 32000 and 64000 cycles of a standard 8 khz telecommunications clock. This integer relationship facilitates connection of a radio communications link using a protocol in accordance with the present invention to a standard telecommunications network because the start of each radio data frame 100 (shown in FIG. 1) will occur in synchronization with the 8 khz clock. Therefore, the radio data link and telecommunications link will be synchronized every data frame.

In view of the above discussion, there are several key features that should be appreciated in the framing structure of the present invention. Specifically, the framing structure provides predictable ATM cell location. The fixed length frame header 110 and single byte subframe headers 120 each cooperate in indicating the imminent transmission of an ATM cell, and ATM cells are continuously and periodically repeated at the same location in the data transmission stream for each frame.

This periodic location of ATM framing is important in a high error rate environment, such as a radio transmission link. When using such a link, burst errors can occur resulting a significant increase in bit errors over a relatively short time period. In such conditions, the format of the present protocol provides additional framing information to prevent the radio link from losing synchronization and having to enter into a time consuming re-synchronization process, during which data transmission is suspended. If frame synchronization can be maintained during burst error conditions, then data transmission (although containing come data errors as a result of the burst error condition) can continue, and error free data transmission can resume immediately upon the cessation of the error condition. If resynchronization is required, however, data transmission cannot continue until after the error condition is removed and the link achieves re-synchronization. During this time period, cells containing good data can be lost. Therefore, if link synchronization is not maintained, link efficiency can suffer greatly when used in a high error rate environment, such a radio applications, where burst error conditions frequently occur.

As discussed above, the current ATM protocol standards use the HEC in the ATM cell header to delineate each cell. The present protocol, however, segments the incoming ATM data stream into 9 subframes, and provides additional framing bytes (in the form of subframe headers 120 shown in FIG. 1) for each subframe. The additional framing bytes act as a confidence checker in that they indicate that link synchronism has been maintained. If one examines the framing bytes over a number of subframes, in combination with the ATM HEC checking, one can establish a confidence level for framing and, under burst error conditions, synchronization of the link can more easily be maintained.

The framing structure also provides multiple frame verification opportunities that can be used to guarantee a valid ATM cell payload. For example, the frame and subframe header patterns can be used to verify proper cell timing and to ensure accurate transmission of ATM cells. Furthermore, the internal ATM cell checksum present in the standard header of each ATM cell can be used to verify error free transmission of that individual ATM cell. Therefore, the use of the present framing protocol in connection with the ATM data format provides for greater transmission error detection.

Frequent framing information in the data format of the present invention further allows for rapid re-synchronization in the event a data transmission error that results in loss of synchronization occurs. In addition to the 7-byte frame header 110, each subframe contains a 1-byte header 120 that can be used to re-synchronize that subframe in the event of an error. Furthermore, a subframe header is encountered approximately every 33 to 886 milliseconds (when using the illustrative data rates shown in FIG. 3). Should a data error occur that results in loss of synchronization of the data signal, this periodic framing information allows the system to rapidly re-synchronize with the transmitted signal.

The framing information also provides a user of the present data transmission system with continuous real-time feedback on the integrity of the data communication physical link. If a significant number of framing errors occur, the user will immediately be aware that the data link integrity has degraded. Accordingly, the user may wish to take appropriate action to adjust or correct radio reception problems, such as, for example, to request retransmission of information from a transmitting station or to increase or decrease transmitted power. By having an immediate indication of radio link integrity, rapid adjustments and corrections can be made to minimize data loss.

In one embodiment of the present invention, the framing protocol is implemented in a time division multiple access (TDMA) environment to support communications over a single duplex RF link between a single headend station and a plurality of substations. In this implementation, one RF channel of the duplex pair, referred to as an outbound channel, would be dedicated to communications from the headend station to the substations and the other RF channel, referred to as an inbound channel, would be dedicated to communications from the substations to the headend station. For compatibility, both the inbound and outbound links would employ a protocol in accordance with the present invention as discussed above.

In this implementation, the transmission of data from the substations using the inbound channel would be under the complete control of the headend station. The headend station would control assignment of available time slots in the inbound channel by sending control information to the substations using the outbound channel. Each time slot could include, for example, a number of data subframes. This is particularly useful where the substations are mobile stations such as, for example, aircraft or automobiles.

Figure 4:
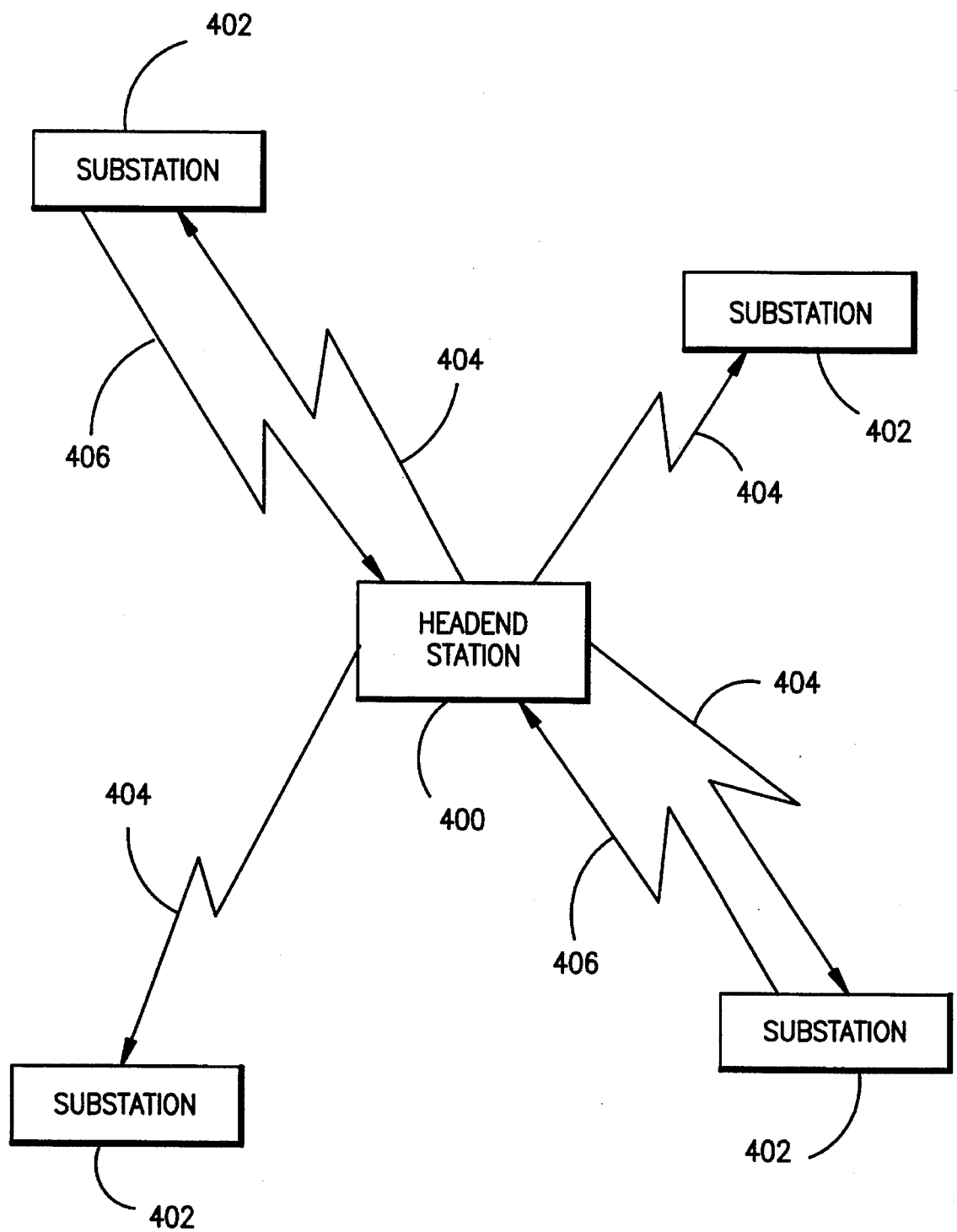
FIG. 4 illustrates an embodiment of the present invention in which the data flaming method of the invention is implemented in a time division multiple access (TDMA) environment to support data communications over a single radio channel between a single headend station and a plurality of substations.

Such an implementation of the present invention is illustrated in FIG. 4. FIG. 4 shows a headend station 400 and a plurality of substations 402. In the most preferred embodiment of the present invention, substations 402 may be mobile stations such as in-flight aircraft. Headend 400 communicates with substations 402 using outbound channels 404, which are received by all substations 402. As discussed in more detail below, outbound channels 404 can include ranging requests and/or control and channel assignment information for substations 402.

Upon assignment from the headend station 400, substations 402 may transmit data (including ranging information, data priority information, or data signals) to headend station 400 during an assigned time slot through inbound channels 406. Depending on the priority given to a transmission from a specified substation, more or less time slots in the inbound channel may be assigned by the headend station 400 to a specified substation 402. Therefore, if several substations currently have high priority information, all available time slots may be assigned to those substations, and no time slots may be assigned to substations having lower priority data. As noted above, in the most preferred embodiment of the present invention, outbound channel 404 and inbound channel 406 constitute a single RF duplex pair.

The framing protocol according to the present invention provides a simple and easily implemented ranging function to determine the distance between a headend station 400 and a plurality of mobile substations 402. This ranging function is particularly important since accurate timing is essential in a TDMA data transmission system in order to ensure error free data transmission. Specifically, it is important to ensure that substations 402 are synchronized with headend 400 so that transmission from substations 402 are received at headend 400 at the proper time and do not overlap with transmissions from other substations 402.

However, where there are a plurality of data transmitters (substations) that are in motion with respect to each other and with respect to the data receiver (headend station), accurate timing can become difficult. Once the distance, or range, of each substation from the headend station is known, however, these variations in timing can be compensated for by controlling each substation to offset its transmit time by an appropriate amount. Accordingly, the accurate determination of range is essential if error free data transmission between a plurality of mobile substations and a headend station is to occur in a TDMA system.

Figure 5:
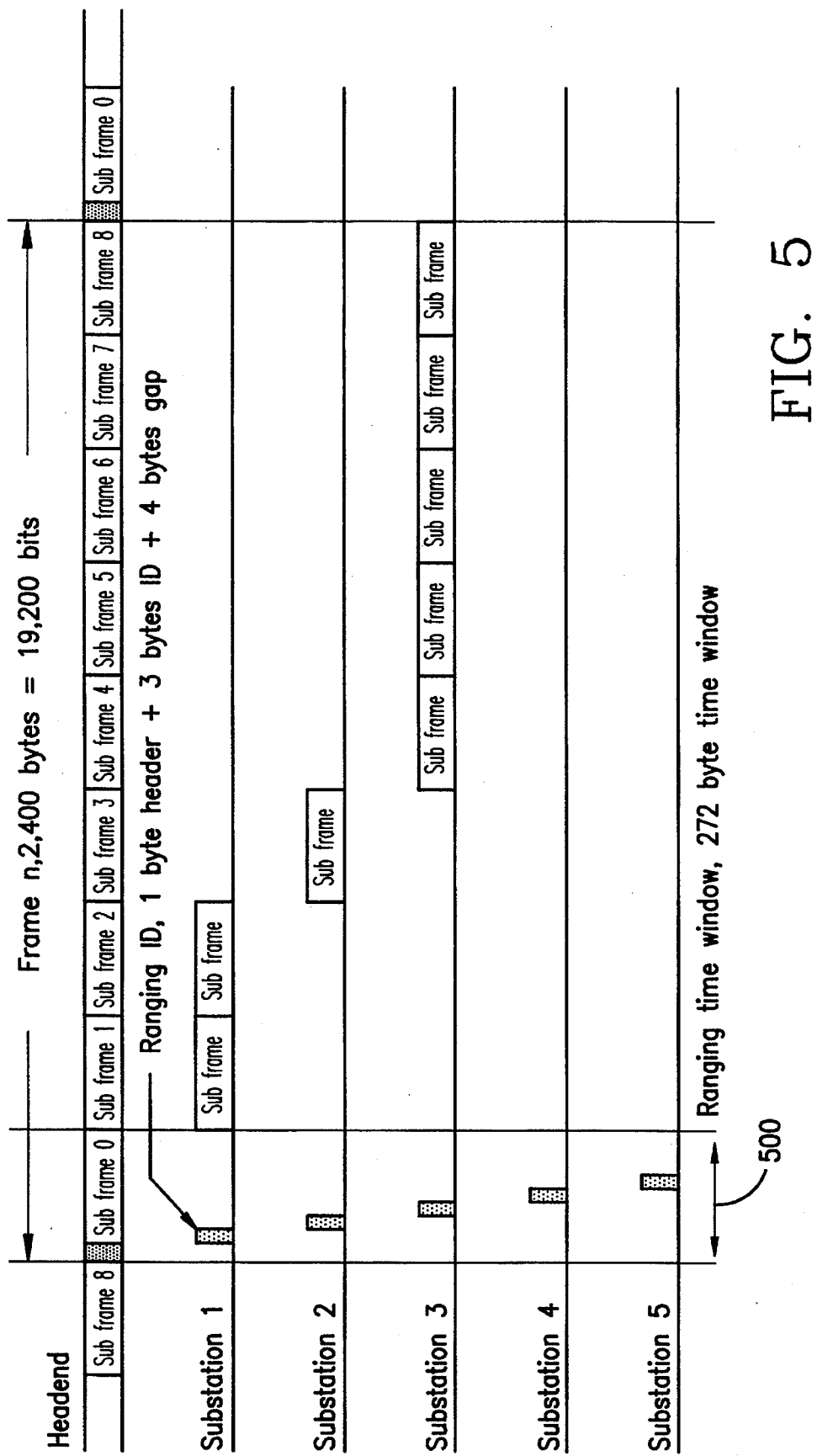
FIG. 5 illustrates a TDMA implementation of the framing method of the present invention in which a single headend station communicates with, and provides channel time slot control information to, a plurality of substations.

Referring to FIG. 5, a TDMA implementation of the framing method of the present invention is illustrated with respect to an inbound channel in which a single headend station communicates with 5 substations. As can be seen in FIG. 5, subframe 0 of each frame (including the 7-byte frame header and 5 53-byte ATM cells) could be used as a ranging time window 500 and is in such a case would be dedicated to the receipt of ranging information from the mobile substations.

If ranging information is required for a number of selected substations, the headend will transmit an ATM cell on the outbound channel instructing a selected number of substations to return ranging information in subframe 0 of the inbound channel. This message will identify the actual substations that need to provide a ranging response. Upon receipt of the ranging message, the targeted substation will send an ID message in the prescribed time slot in the immediately following subframe 0 of the inbound channel. In this case, the headend, having requested ranging information, will instruct all substations not to transmit on subframe 0 of the inbound channel so that the ranging information can be received without conflict. Subframe 0 currently contains enough time slots for receiving ranging information from up to 34 substations. The system can accommodate more than 34 substations by using subframe 0 of multiple frames for ranging. The frequency of ranging depends on the relative moving speed between the headend and each substation.

For example, if the selected substation is 10 miles from the headend and if each substation has a constant processing time of, for example, 100 microseconds, then the headend station will receive a response from the substation after approximately 207.29 microseconds offset from the preset time slot in reference to subframe 0. Noting this delay, the headend will instruct the substation to move its transmit reference window forward by 207.29 microseconds, thus allowing this particular substation to align its transmit framing with the headend Subframe 0.

This time offset adjustment is related to the distance of the substation in such a manner that any data transmissions from the plurality of substations will not interfere with each other when received at the headend. In other words, when a substation is farther from the headend, the substation will need a larger offset adjustment to compensate for the larger propagation delay time. Conversely, if the substation is close to the headend, then a shorter time adjustment is needed for the proper timing alignment. This process can be repeated so that range information for all active substations can be determined and the appropriate time offset to prevent data collisions and overlap in the return data transmissions from the substations can be provided to each substation.

Since the headend and the substations can all be in motion relative to each other, this ranging procedure must be repeated frequently enough to make sure that at no time would a substation's timing reference be misaligned for more than approximately ⅓ time. This ⅓ time parameter is determined to prevent possible bit overlapping when switching the transmission window from substation to substation. Since data is read in the middle of a bit, ⅓ overlap will provide enough openings to correctly read all data transmitted in the network. This timing limitation effectively determines the number of users that can transfer information using this protocol given the maximum relative motion speed of the headend and substation.

For example, if one designs the system to provide ranging for all substations in every subframe 0, then the maximum relative speed between the headend and the substation is in excess of 3000 miles per hour. The total substation capacity per system will be 34. However, if the maximum relative speed is halved, then the system can accommodate 68 substations, by ranging each substation during every other subframe 0.

The ranging information supplied by the substation is encoded for error correction using any suitable error correction protocol and contains a 10 bit station ID code and a 6 bit status code, which includes a 3 bit priority code and a 3 bit queue depth code. The priority code indicates the highest priority of information present at the substation for transmission. As will be discussed below, the present protocol allows complete control of information transfer to reside with the headend, which is facilitated through the transmission of this priority code by the substation. With 3 bits, up to 8 separate priorities can be indicated. Depending on the priority indicated from the specific substation, and the priority of information indicated from other substations, subframe assignments on the inbound channel are made by the headend.

In addition to the priority code, the headend can consider the queue depth code in making bandwidth assignments. The 3 bit queue depth code represent the number of subframes required to empty the queue corresponding to the transmitted priority code for this substation. Again, the 3 bits of the queue depth code provides for up to 8 indications, one of which could signify an impending queue overflow. For example, if this 3 bit depth code is set to binary "111", the headend could be notified that a potential overflow condition exists and that data could be lost of transmission bandwidth is not assigned. Of course, other indication of the priority or amount of data could be encoded through the use of these six bits, and the examples given are for illustration only.

The outbound channel from the headend also serves to supply control information to the substations to assign subsequent subframes to designated substations that have data to transmit to the headend station. In this manner, data transmission from the substations to the headend station is completely under the control of the headend station. To determine the allocation of the subframes between competing substations, the headend can consider the priority and queue depth indications from each substation as well as any other relevant information that is available. This pen-nits complete control over the amount and rate of data transmission from each substation to remain with the headend station and prevents one substation from preempting another substation having higher priority data to be transferred.

In view of the above discussion, it will be readily apparent to one of skill in the art that the present invention provides a data formatting method that is particularly suited to the transmission of data over a low speed radio transmission link in a standard data formatting protocol such as an ATM format. Through the use of this method, data transmitted over a radio communication link can be easily interfaced with and transmitted over a wireline data communications system that employs an ATM data format.

Figure 6:
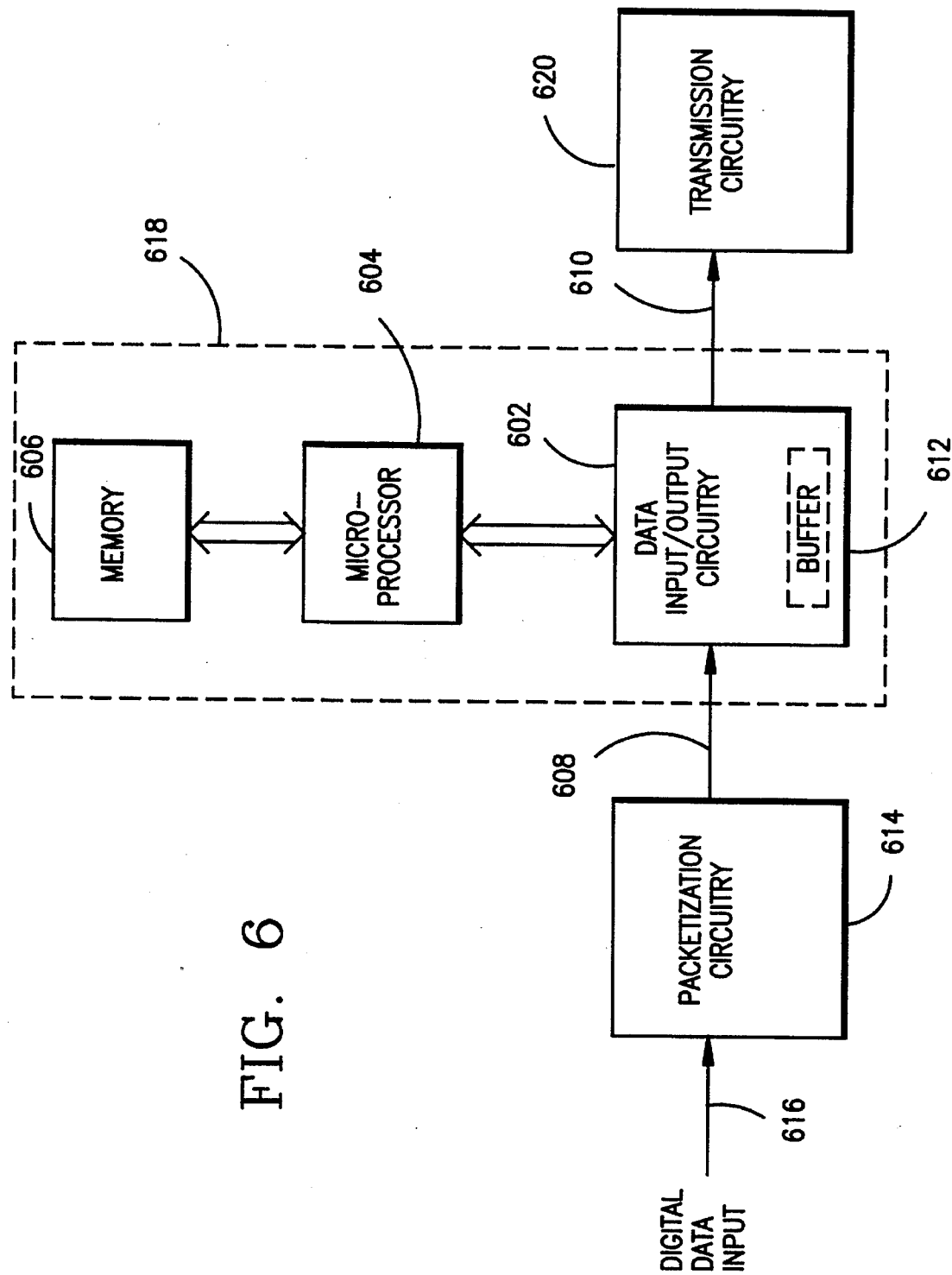
FIG. 6 illustrates a block diagram of a system for formatting a plurality of digital data packets intended for transmission over a standard telecommunications network into a form suitable for transmission using a communications link periodically experiencing high data error rates in accordance with the present invention.

Referring next to FIG. 6, a block diagram of a system for formatting a plurality of digital data packets intended for transmission over a standard telecommunications network in accordance with the present invention is illustrated. As can be seen in FIG. 6, the preferred embodiment of a system for implementing the method of the present invention is implemented through the use of a microprocessor or microcontroller and associated software. Of course, additional integrated circuits (such as, for example, address and data buffer circuits) may be used to support the microprocessor function, but are not shown for clarity. The protocol of the present invention is also suitable for hardware implementation, in which case the hardware logic would follow closely the software model illustrated in FIG. 6.

The system includes data input/output interface 602 that operates to receive digital data packets through input 608 and to output a formatted data stream on data output 610. Data input/output interface 602 could also include a buffer memory 612, or other associated circuitry known to those of skill in the art.

The system of the present invention includes packetization circuitry 614 that operates to receive digital data through digital data input 616 and to generate digital data packets that are provided to data input/output interface 602 through input 608. In operation, the packetization circuitry operates to format the incoming digital data into a plurality of standardized digital data packets, such as standard ATM cells.

Also, connected to data output 610 is conventional transmission circuitry 620 that operates to receive a formatted data frame from data input/output circuitry 602 and to transmit that data frame over a suitable communications network. For example, transmission circuitry 620 could in radio frequency components to receive the formatted digital data frame, to modulate that digital data onto an radio frequency carder signal, and to transmit the modulated signal to a remote location. Transmission circuitry 620 is conventional circuitry known to those of skill in the art and any circuitry suitable for transmitting digital data could be used with the present invention.

Connected to data input/output interface 602 is microprocessor 604. Microprocessor 604 operates to receive data from data input/output interface 602 and to provide formatted data to data input/output interface 602. Microprocessor 604 could be any suitable microprocessor such as an Intel 80×86 series or equivalent. Of course, it will be apparent to those of skill in the art that any suitable microprocessor or microcontroller capable of performing the data formatting operation discussed below could be used as microprocessor 604.

Connected to microprocessor 604 is memory 606, which could be internal to the microprocessor 604 or contained on a separate memory integrated circuit depending on the specific design of the system. Although the components are shown as separate components in FIG. 6, the scope of the present invention should not be considered to be so limited. In fact, the separate components shown in FIG. 6 could all be integrated into a single integrated circuit or other electrical component to reduce the size and complexity of the formatting system. Furthermore, the components within box 618 (specifically microprocessor 604, memory 606 and data input/output circuitry 602) could be integrated into a single integrated circuit chip, while data packetization circuitry 614 and transmission circuitry 620 remain as separate components.

Figure 7:
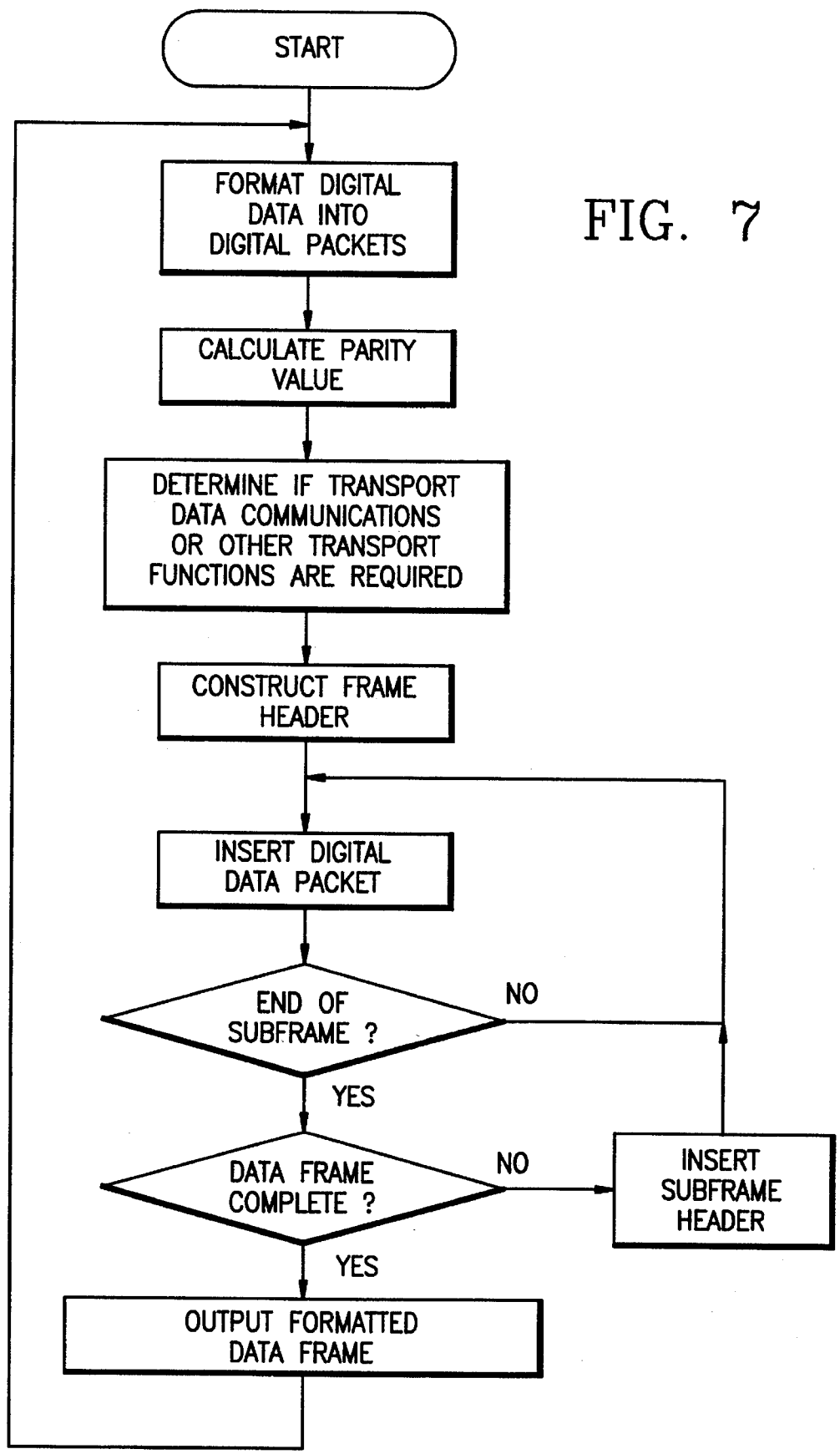
FIG. 7 illustrates a flowchart of a software program used with the system shown in FIG. 6 for formatting a plurality of digital data packets in accordance with the present invention.

From the discussion above, it will be apparent that the formatting system of the present invention can substantially be implemented in software operating in microprocessor 604. A flowchart of a software program that can be used to format the data in accordance with the present invention is shown in FIG. 7. As can be seen in FIG. 7, the process begins at block 702, in which digital data is formatted into a plurality of standardized digital data packets, such as ATM cells. Once the digital data has been formatted into these data packets, control passes to block 704, where the system will calculate a parity value for the data frame, such as a bit-interleave-parity-8 (or BIP-8) discussed above.

Control then passes to block 706, where the system determines if transport data communications channel support or other transport data functions are required. If these functions are determined to be required, then appropriate data can be submitted into the frame header in accordance with the desired support function. Once this information is ascertained, the control passes to block 708, where the system constructs a framing header.

With the frame header complete, the system next inserts a data packet in block 710. Control then passes to block 712, where the system checks to see if the end of a subframe has been reached. As noted above, a typical subframe in accordance with the present invention will contain five 53-byte ATM cells. Of course, if other data packets are employed, the number of data packets may increase or decrease in order to maintain the overall formatting of the present protocol. If the system determines that the end of a subframe has not been reached, control returns to block 710, where another data packet is inserted.

If, however, the end of a subframe has occurred, then control passes to block 714, where the system checks to determine if the data frame is complete. If the data frame is incomplete, control passes to block 716, where a subframe header is inserted. Control then returns to block 710, and additional data packets are inserted. If the data frame is complete, then control passes to block 718, where the complete formatted data frame is output to the data transmission system.

From the above description, it will be apparent to one of skill in the art that the data formatting protocol of the present invention can easily be implemented in a microprocessor based system operating as illustrated in FIG. 7. Of course, other less preferred implementations of the present invention could be used to format the data. For example, rather than a microprocessor based implementation, the present formatting system could be implemented using discrete electronic components.

Although the invention has been described with reference to specific embodiments, various modifications of the disclosed embodiments as well as other embodiments of the invention will become apparent to persons skilled in the art on reference to the detailed description of the invention contained herein. Accordingly, the claims of the present application should not be limited to the specific embodiments described.

I claim:

1. A method of formatting a plurality of digital data packets intended for transmission over a standard telecommunications network into a form suitable for transmission using a communications link periodically experiencing high data error rates comprising the steps of:

formatting the digital data packets into a plurality of subframes; and forming a data frame comprising one subframe having a frame header and a plurality of subframes having subframe headers different from said frame header, wherein each of the digital data packets is a 53-byte ATM cell and each said subframe comprises five of said 53-byte ATM cells.

2. The method of claim 1 wherein said data frame consists of one subframe having a frame header and eight subframes having subframe headers.

3. The method of claim 2 wherein said data frame has a length of 2400 bytes.

4. The method of claim 3 wherein each of said subframe headers is a single byte.

5. A method of formatting a plurality of digital data packets intended for transmission over a standard telecommunications network into a form suitable for transmission using a communications link periodically experiencing high data error rates comprising the steps of:

formatting the digital data packets into a plurality of subframes;

forming a data frame comprising one subframe having a frame header and a plurality of subframes having subframe headers different from said frame header, wherein the communications link is a radio communications link.

6. The method of claim 5 wherein said radio communications link operates to transfer data at a rate between 2,400 and several mega-bits-per-second.

7. A method of formatting a plurality of digital data packets intended for transmission over a standard telecommunications network into a form suitable for transmission using a communications link periodically experiencing high data error rates comprising the steps of:

formatting the digital data packets into a plurality of subframes;

forming a data frame comprising one subframe having a frame header and a plurality of subframes having subframe headers different from said frame header, wherein the standard telecommunications network includes a network clock having a predetermined frequency, said clock operating to synchronize data transmission over the standard telecommunications network and wherein a length of said data frame and a data transfer rate of said communications link are interrelated such that a time between the start of each successive data frame is an integer multiple of said network clock.

8. The method of claim 7 wherein said predetermined frequency is 8 khz and said length of said data frame is 2400 bytes.

9. A method of formatting a plurality of digital data packets intended for transmission over a standard telecommunications network into a form suitable for transmission using a communications link periodically experiencing high data error rates comprising the steps of:

formatting the digital data packets into a plurality of subframes;

forming a data frame comprising one subframe having a frame header and a plurality of subframes having subframe headers different from said frame header, wherein each of said subframe headers is a DC balanced code.

10. The method of claim 9 wherein each of said subframe headers is a single byte.

11. The method of claim 10 wherein said single byte is E8 hexadecimal.

12. A method of formatting a plurality of digital data packets intended for transmission over a standard telecommunications network into a form suitable for transmission using a communications link periodically experiencing high data error rates comprising the steps of:

formatting the digital data packets into a plurality of subframes;

forming a data frame comprising one subframe having a frame header and a plurality of subframes having subframe headers different from said frame header, wherein said frame header consists of seven bytes.

13. The method of claim 12 wherein said seven bytes of said frame header includes two frame indication bytes, one parity byte and four overhead bytes for providing network related support functions.

14. The method of claim 13 wherein said four overhead bytes for providing network related support functions include 2 bytes available for performing byte stuffing operation to maintain long term synchronization between the standard telecommunications network and the communications link.

15. The method of claim 13 wherein said parity byte is a bit-interleave-parity-8 byte.

16. The method of claim 13 wherein said two frame indication bytes are a DC balanced code.

17. The method of claim 16 wherein said two frame indication bytes are F628 hexadecimal.

18. A method of formatting and transferring a data signal over a time division multiple access radio link between a single substation selected from a plurality of mobile substations and a headend station, said data signal including a plurality of data frames, each data frame having a plurality of subframes, and each subframe having a plurality of digital data packets, comprising the steps of:

determining a relative time offset adjustment for the selected substation, said relative time offset adjustment indicating a time that the selected substation is to transmit the data signal such that interference with data signals from other substations is reduced or avoided;

formatting the data to be transmitted from said selected substation into a plurality of subframes each containing a plurality of digital data packets; and transmitting said plurality of subframes from said selected substation to the headend station at a time adjusted according to said relative time offset adjustment.

19. The method of claim 18 wherein each of said digital data packets is a standard ATM cell.

20. The method of claim 19 wherein said data frame comprises nine subframes, one of said nine subframes having a frame header and the other eight of said subframes having subframe headers.

21. The method of claim 20 wherein each of said subframes contains five standard ATM cells.

22. The method of claim 20 wherein said subframe having a frame header is periodically used to determine said relative time offset adjustment and said eight subframes having subframe headers are used to transfer said digital data packets between said substations and said headend station.

23. The method of claim 20 wherein said frame header consists of seven bytes and said subframe headers consist of a single byte.

24. The method of claim 23 wherein said data frame has a length of 2400 bytes.

25. The method of claim 18 wherein said step of determining a relative time offset adjustment includes the steps of:

transmitting, from said headend station, a signal requesting at least one of said plurality of substations to return ranging information at a predetermined time;

transmitting said ranging information from said at least one substation at a time approximately corresponding to said predetermined time;

receiving said ranging information at said headend station; and measuring a relative time offset adjustment, said relative time offset adjustment being the time between said predetermined time at which said ranging information was expected and said time that said ranging information was actually received at said headend station.

26. A system for formatting a plurality of digital data packets intended for transmission over a standard telecommunications network into a form suitable for transmission using a communications link periodically experiencing high data error rates and for transferring the formatted data packets using the communications link comprising:

input means for receiving a plurality of the digital data packets;

formatting means connected with said input means for generating a formatted data signal including a plurality of subframes, each said subframe comprising a plurality of said digital data packets, and for forming a data frame comprising one subframe having a frame header and a plurality of subframes having subframe headers different from said frame header; and transmitting means connected with said formatting means for transmitting said formatted data signal using the communications link.

27. The system of claim 26 wherein each of said digital data packets is a standard 53-byte ATM cell.

28. The system of claim 27 wherein each said subframe comprises five of said 53-byte ATM cells.

29. The system of claim 28 wherein said data frame consists of one subframe having a frame header and eight subframes having subframe headers.

30. The system of claim 29 wherein said data frame has a length of 2400 bytes.

31. The system of claim 30 wherein each of said subframe headers is a single byte.

32. A method of formatting a plurality of digital data packets intended for transmission over a standard telecommunications network into a form suitable for transmission using a radio communications link periodically experiencing high data error rates comprising the steps of:

formatting the digital data packets into a plurality of subframes;

forming a data frame comprising one subframe having a frame header and a plurality of subframes having subframe headers different from said frame header.

33. The method of claim 32 wherein said radio communications link operates to transfer data at a rate between 300 and several mega-bits-per second and each of said digital data packets is a 53-byte ATM cell.

34. The method of claim 33 wherein said data frame has a length of 2400 bytes, each of said subframes comprise 5 ATM cells, each of said data frames consist of one subframe having a 7 byte frame header and eight subframes having a single byte subframe header, each of said subframe headers contains a designated code used as an indicator and each of said frame headers contains a different designated indicator code.

35. A method of formatting a plurality of digital data packets intended for transmission over a standard telecommunications network including a network clock having a predetermined frequency, said clock operating to synchronize data transmission over the standard telecommunications network, into a form suitable for transmission using a communications link periodically experiencing high data error rates comprising the steps of:

formatting the digital data packets into a plurality of subframes;

forming a data frame comprising one subframe having a frame header and a plurality of subframes having subframe headers different from said frame header, wherein a length of said data frame and a data transfer rate of said communications link are interrelated such that a time between the start of each successive data frame is an integer multiple of said network clock.

36. The method of claim 35 wherein said communications link has a bit-error-rate of $10^{-6}$ or greater and each of said digital data packets is a 53-byte ATM cell.

37. The method of claim 36 wherein said predetermined frequency is 8 khz, said data frame has a length of 2400 bytes, each of said subframes comprise 5 ATM cells, each of said data frames consist of one subframe having a 7 byte frame header and eight subframes having a single byte subframe header, each said subframe headers contains a designated code used as an indicator and each said frame headers contains a different designated indicator code.

38. A method of formatting a plurality of digital data packets intended for transmission over a standard telecommunications network into a form suitable for transmission using a communications link periodically experiencing high data error rates comprising the steps of:

formatting the digital data packets into a plurality of subframes;

forming a data frame comprising one subframe having a frame header and a plurality of subframes having subframe headers different from said frame header, wherein said frame header consists of seven bytes that include a frame indicator and at least 2 bytes for performing a byte stuffing operation to maintain long term synchronization between the communications network and the communications link.

39. The method of claim 38 wherein said communications link has a bit-error-rate of $10^{-6}$ or greater and each of said digital data packets is a 53-byte ATM cell.

40. The method of claim 39 wherein said data frame has a length of 2400 bytes, each of said subframes comprise 5 ATM cells, each of said data frames consist of one subframe having said frame header and eight subframes having a single byte subframe header, and each of said subframe headers contain a designated indicator code.

41. A method of formatting a plurality of digital data packets intended for transmission over a standard telecommunications network into a form suitable for transmission using a communications link periodically experiencing high data error rates comprising the steps of:

formatting the digital data packets into a plurality of subframes;

forming a data frame comprising one subframe having a frame header and a plurality of subframes having subframe headers different from said frame header, wherein said frame header includes 2 bytes for performing a byte stuffing operation to maintain long term synchronization between the standard telecommunications network and the communications link.

42. The method of claim 41 wherein said communications link has a bit-error-rate of $10^{-6}$ or greater.

43. A method of formatting a plurality of digital data packets intended for transmission over a standard telecommunications network and for transmitting the formatted digital data packets using a communications link periodically experiencing high data error rates comprising the steps of:

formatting the digital data packets into a plurality of subframes;

forming a data frame comprising one subframe having a frame header and a plurality of subframes having subframe headers different from said frame header;

transmitting said data frame over a data communications link having a bit-error-rate of $10^{-6}$ of greater.

44. The method of claim 43 wherein each of said digital data packets is a 53-byte ATM cell, said data frame has a length of 2400 bytes, each of said subframes comprise 5 ATM cells, each of said data frames consist of one subframe having a 7 byte frame header and eight subframes having a single byte subframe header, each said subframe headers contain a designated code used as an indicator and each of said frame headers contain a different designated indicator code.

* * * * *